United States Patent
Huss et al.

(10) Patent No.: US 11,977,907 B2
(45) Date of Patent: May 7, 2024

(54) HYBRID PUSH AND PULL EVENT SOURCE BROKER FOR SERVERLESS FUNCTION SCALING

(71) Applicant: RED HAT, INC., Raleigh, NC (US)

(72) Inventors: Roland Ludwig Huss, Bavaria (DE); Huamin Chen, Westford, MA (US); Ricardo Noriega De Soto, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 497 days.

(21) Appl. No.: 17/202,509

(22) Filed: Mar. 16, 2021

(65) Prior Publication Data

US 2022/0300312 A1  Sep. 22, 2022

(51) Int. Cl.
*G06F 9/455* (2018.01)
*G06F 9/38* (2018.01)
*G06F 9/50* (2006.01)

(52) U.S. Cl.
CPC ........ *G06F 9/45558* (2013.01); *G06F 9/3836* (2013.01); *G06F 9/45545* (2013.01); *G06F 9/505* (2013.01); *G06F 2009/45595* (2013.01)

(58) Field of Classification Search
CPC ............. G06F 9/45558; G06F 9/3836; G06F 9/45545; G06F 9/505; G06F 2009/45595
See application file for complete search history.

(56) References Cited

U.S. PATENT DOCUMENTS

| | | | |
|---|---|---|---|
| 7,778,260 B2 * | 8/2010 | Sturniolo | H04W 8/02 370/310 |
| 8,539,079 B2 | 9/2013 | Thireault | |
| 9,280,375 B1 * | 3/2016 | Youseff | G06F 9/45533 |
| 9,876,851 B2 | 1/2018 | Chandramouli et al. | |
| 10,007,513 B2 | 6/2018 | Malladi et al. | |
| 11,080,294 B1 * | 8/2021 | Johnston | G06F 40/205 |
| 2018/0287923 A1 * | 10/2018 | Emam | H04L 47/58 |
| 2019/0041960 A1 | 2/2019 | Guim Bernat et al. | |
| 2020/0379805 A1 | 12/2020 | Porter et al. | |
| 2021/0263779 A1 * | 8/2021 | Haghighat | G06F 9/5061 |
| 2021/0373978 A1 * | 12/2021 | Fong | G06F 9/546 |

OTHER PUBLICATIONS

Pedro Garcia Lopez, Triggerflow: Trigger-based Orchestration of Serverless Workflows, Jul. 13-17, 2020; ACM (Year: 2020).*
Ghosh, R. et al. (Dec. 9, 2017). "Distributed Scheduling of Event Analytics across Edge and Cloud" Department of Computational and Data Sciences, Indian Institute of Science, Bangalore India, 29 pages.
Yue, F. (Jul. 8, 2020). "Edge Computing and Load Balancing" Kemp Technologies, Inc., 3 pages.

* cited by examiner

*Primary Examiner* — Dong U Kim
(74) *Attorney, Agent, or Firm* — Womble Bond Dickinson (US) LLP

(57) ABSTRACT

Events to be executed by one or more serverless functions are received from an events queue. A determination that a first set of the events are to be executed by one or more serverless functions at a local host system and a second set of the events are to be executed at one or more serverless functions at a remote host system is made. The first set of the events are directed to the one or more serverless functions at the local host system and the second set of the events are directed to the one or more serverless functions at the remote host system.

14 Claims, 5 Drawing Sheets

400

```
┌─────────────────────────────────────┐
│  RECEIVE, FROM AN EVENT QUEUE, A    │
│  PLURALITY OF EVENTS TO BE EXECUTED │
│  BY ONE OR MORE SERVERLESS FUNCTIONS│
│                 410                 │
└─────────────────────────────────────┘
                  │
                  ▼
┌─────────────────────────────────────┐
│    DETERMINE THAT A FIRST SET OF THE│
│  PLURALITY OF EVENTS ARE TO BE      │
│  EXECUTED BY ONE OR MORE SERVERLESS │
│  FUNCTIONS AT A LOCAL HOST SYSTEM   │
│  AND A SECOND SET OF THE PLURALITY  │
│  OF SERVERLESS FUNCTIONS ARE TO BE  │
│  EXECUTED AT ONE OR MORE SERVERLESS │
│  FUNCTIONS AT A REMOTE HOST SYSTEM  │
│                 420                 │
└─────────────────────────────────────┘
                  │
                  ▼
┌─────────────────────────────────────┐
│  DIRECT THE FIRST SET OF THE        │
│  PLURALITY OF EVENTS TO THE ONE OR  │
│  MORE SERVERLESS FUNCTIONS AT THE   │
│  LOCAL HOST SYSTEM AND THE SECOND   │
│  SET OF THE PLURALITY OF EVENTS TO  │
│  THE ONE OR MORE SERVERLESS         │
│  FUNCTIONS AT THE REMOTE HOST SYSTEM│
│                 430                 │
└─────────────────────────────────────┘
```

FIG. 4

HYBRID PUSH AND PULL EVENT SOURCE BROKER FOR SERVERLESS FUNCTION SCALING

TECHNICAL FIELD

Aspects of the present disclosure relate to a serverless function system, and more particularly, to utilizing a hybrid push and poll event source broker for serverless function scaling.

BACKGROUND

A serverless function system may be executed by a cloud computing system. The cloud computing system may dynamically manage the allocation and provisioning of serverless functions on servers of the cloud computing system. The serverless functions may be execution environments for the performance of various functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram of a method of utilizing a push and poll event broker, in accordance with some embodiments.

DETAILED DESCRIPTION

Figure 1:
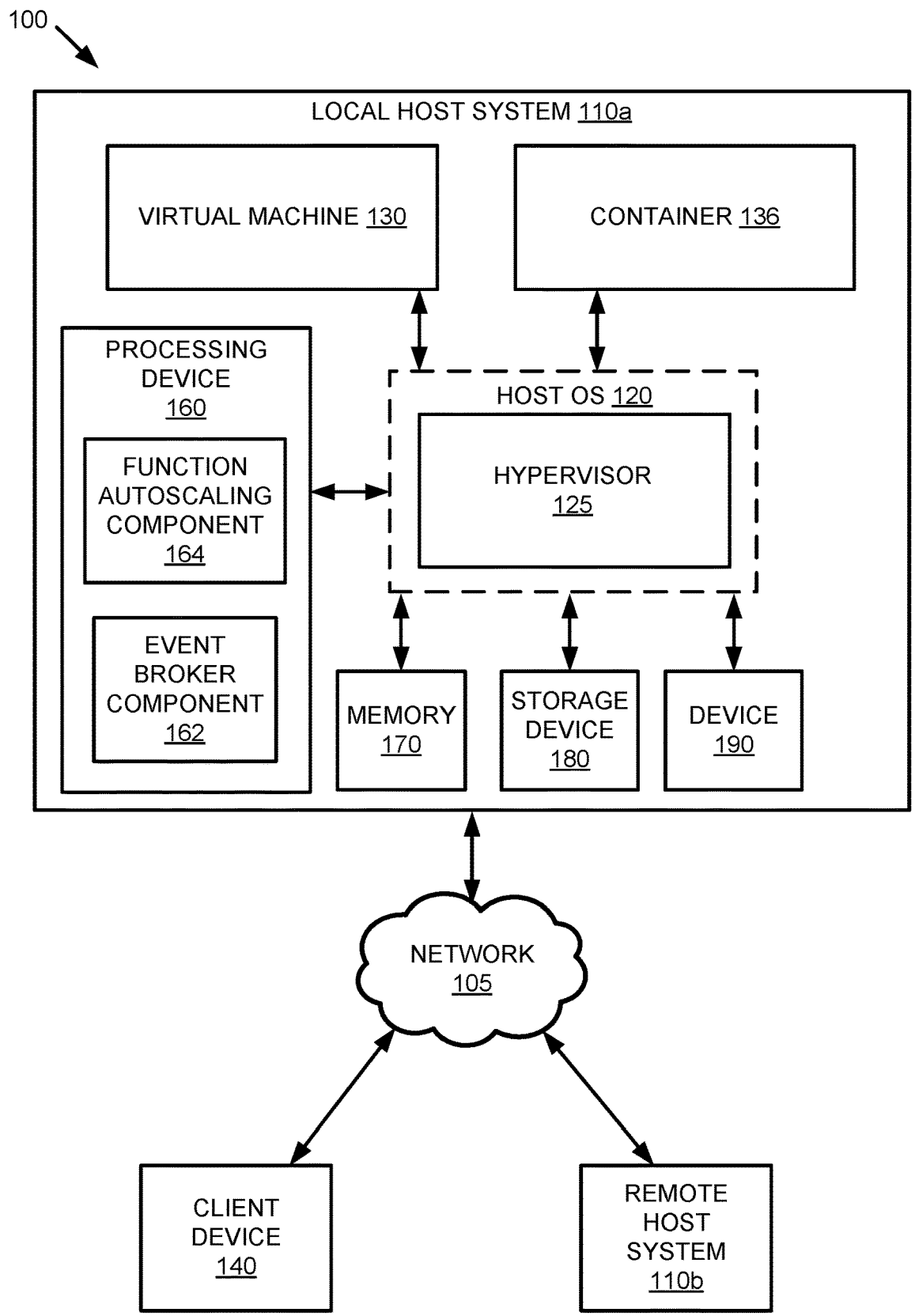
FIG. 1 is a block diagram that illustrates an example computer architecture, in accordance with some embodiments.

In embodiments, a cloud computing system may provide a serverless framework for the performance of client functions/operations (also referred to as "functions" hereafter). For example, the serverless framework may execute functions of a client web application. The serverless framework may invoke one or more serverless functions to execute the functions for client requests and events. In embodiments, the serverless functions may be execution environments for the execution of the functions. For example, the serverless functions may be virtual machines (VMs) and/or containers.

A serverless function architecture may be a cloud computing system (also referred to as "cloud" hereafter) that includes multiple clusters of one or more host systems at various geographic locations that are operatively coupled to one another via a network. The serverless function architecture may receive events that correspond to various operations that are to be executed using one or more serverless functions that are supported by the host systems of the cloud. For example, the serverless function architecture may receive a first event that corresponds to storing an object in a bucket, a second event that corresponds to attaching an image to an email, etc. In embodiments, the events received by the serverless function architecture may be received from one or more client devices in the form of requests for these events to be performed by the serverless function architecture.

As previously described, the cloud may be made up of clusters of one or more host systems at various geographic locations. In the cloud, one of the clusters may be considered a local cluster that includes one or more local host systems, while the remaining clusters of the cloud may be considered remote clusters that include one or more remote host systems. In embodiments, the designation of a local host system may be dependent on a location associated with the events. For example, if the events are associated with one or more client devices in a particular office building, than a cluster of one or more host systems located at the particular office building may be the local cluster. In some embodiments, the designation of a local host system may be dependent on a latency for performing the actions associated with the events. For example, a local host system may be a particular host system that has a lower latency for performing the actions than other host systems of the cloud.

As the events are received by the serverless function architecture, the events are placed into an events queue. An event broker may then direct the events to endpoints of serverless functions at the different host systems of the cloud for execution. Meanwhile, an autoscaling component polls the event queue to determine the number of events in the event queue and scale a number of serverless functions that are available to execute the actions associated with the events. The autoscaling component may scale the number of serverless functions by invoking one or more serverless functions or removing one or more serverless functions supported by host systems of the serverless function architecture.

Because the local host system has a lower latency than the other host systems of the cloud, increasing the number of events that are executed by the local host system may improve the response time and performance of the serverless function architecture. However, the local host system has a finite amount of computing resources (e.g., processing bandwidth, memory, storage space, etc.), which leads to other events having to be directed to one or more remote host systems of the cloud, increasing the latency of the performance of these events and decreasing the performance of the serverless function architecture.

Aspects of the disclosure address the above-noted and other deficiencies by utilizing a hybrid push and pull event broker for serverless function scaling. An autoscaling component may poll an event queue to determine the number of events that are included in the event queue. In embodiments, the autoscaling component may identify the different types of events that are present in the event queue. For example, the autoscaling component may identify a first event as a modification to a database, a second event as storing an object at a bucket, a third event as transmitting a notification, etc.

The autoscaling component may use the information received from polling the event queue to determine a projected computing resource usage for execution of the actions associated with the events included in the event queue. The projected computing resource usage may correspond to an estimated amount of computing resources that will be utilized by the execution of each event in the event queue. For example, the projected computing resource usage may correspond to an estimate of the amount of computing bandwidth, memory, and storage space that will be used for an event that is to store an object at a bucket at a host system.

The autoscaling component may compare the projected computing resource usage for the events in the event queue to the computing resources of a local host system that are available for the execution of the actions associated with the events in the event queue. The autoscaling component may determine how many of the actions may be executed by the local host system in view of the comparison. Upon determining which actions may be executed by the local host system and which actions are to be executed by other host systems of the cloud, the autoscaling component may modify the headers of the events associated with the actions to indicate whether each event is to be directed to an endpoint for a serverless function at the local host system, or an endpoint for a serverless function at a remote host system of the cloud.

Upon modifying the headers, the events in the event queue are pushed to an event broker for direction to the various serverless functions. The event broker may examine the header that has been modified by the autoscaler for each of the events in the event queue. The event broker may then direct the different events to serverless functions at the local host system or a remote host system in view of the header. For example, if the autoscaling component modified a header of a first event to indicate that the event is to be executed by the local host system, then the event broker may direct the first event to a serverless function supported by the local host system. In another example, if the autoscaling component modified a header of a second event to indicate that the event is to be executed by a remote host system, then the event broker may direct the second event to a serverless function supported by the remote host system.

By having the autoscaling component poll the event queue and determine a projected computing resource usage for the events in the event queue, the number of events that can be executed by serverless functions at the local host system may be maximized. Because the local host system has a lower latency for executing the events, the response time for these actions will decrease, improving the performance of the serverless function architecture.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes local host system 110a, remote host system 110b, and client device 140. The local host system 110a, remote host system 110b, and client device 140 include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments local host system 110a, remote host system 110b, and client device 140 may include a plurality of processing devices, storage devices, and devices. The local host system 110a, remote host system 110b, and client device 140 may be a server, a mainframe, a workstation, a personal computer (PC), a mobile phone, a palm-sized computing device, etc. In embodiments, local host system 110a, remote host system 110b, and client device 140 may be separate computing devices. In some embodiments, local host system 110a, remote host system 110b and/or client device 140 may be implemented by a single computing device. For clarity, some components of client device 140 and remote host system 110b are not shown. Furthermore, although computer system architecture 100 is illustrated as having two host systems and a single client device, embodiments of the disclosure may utilize any number of host systems and any number of client devices.

Local host system 110a and remote host system 110b may additionally include one or more virtual machines (VMs) 130, one or more containers 136, and host operating system (OS) 120. VM 130 is a software implementation of a machine that executes programs as though it was an actual physical machine. Container 136 acts as isolated execution environments for different functions of applications, as previously described. The VM 130 and container 136 may serve as execution environments for workloads of a serverless function architecture. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The local host system 110a, remote host system 110b, and client device 140 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of local host system 110a, remote host system 110b, and/or client device 140.

In embodiments, processing device 160 may execute an event broker component 162 and/or a function autoscaling component 164. The function autoscaling component 164 may poll an event queue to determine a number of events that are included in the event queue. The function autoscaling component may further modify the headers of the events in the event queue to direct the events to serverless functions at local host system 110a or remote host system 110b. The event broker component 162 may examine the headers of the events and direct the events to serverless functions at local host system 110a or remote host system 110b. Further details regarding the event broker component 162 and the function autoscaling component 164 will be discussed at FIGS. 2-4 below.

Figure 2:
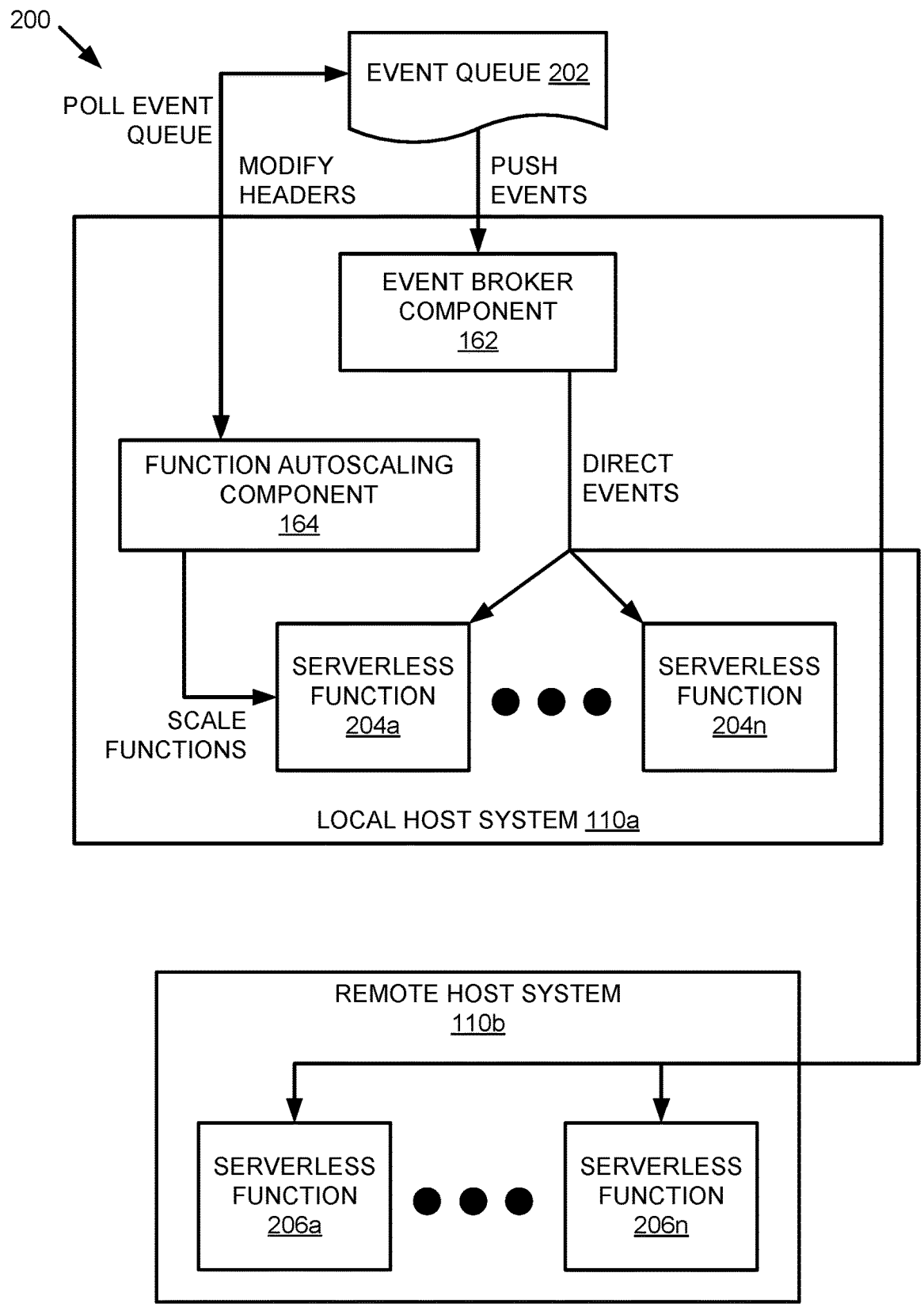
FIG. 2 is an illustration of a serverless function system utilizing a hybrid push and poll event broker, in accordance with embodiments of the disclosure.

FIG. 2 is an illustration of a serverless function system 200 utilizing a hybrid push and poll event broker, in accordance with embodiments of the disclosure. The serverless function system 200 may include local host system 110a, remote host system 110b, event broker component 162, and function autoscaling component 164, as previously described at FIG. 1. Local host system 110a and remote host system 110b may support a serverless functions 204a-n and serverless functions 206a-n, respectively. Serverless functions 204a-n and serverless functions 206a-n may correspond to any number of serverless functions that may execute actions associated with events received by the serverless function system 200. In embodiments, serverless functions 204a-n and serverless functions 206a-n may correspond to one or more virtual machines, containers, or any combination thereof The serverless function system 200 may include an event queue 202 that includes a listing of events that have been received by the serverless function system. As previously described, events that are included in the event queue 202 may correspond to different actions that are to be executed using serverless functions 204a-n or serverless functions 206a-n. In embodiments, the events that are included in the event queue 202 may correspond to requests that are received from one or more client devices by the serverless function system 200. In embodiments, the event queue 202 may be stored at local host system 110a. In some embodiments, the event queue 202 may be stored at a separate computing system.

The function autoscaling component 164 may poll the event queue to determine the number of events that are included in the event queue 202. In embodiments, the function autoscaling component 164 may identify the different types of events that are present in the event queue 202. For example, the function autoscaling component 164 may identify a first event as a modification to a database, a second event as storing an object at a bucket, a third event as transmitting a notification, etc.

In some embodiments, the function autoscaling component 164 may poll the event queue at a determined frequency. Because the polling of the event queue 202 utilizes computing resources of the local host system, the function autoscaling component 164 polling the event queue 202 too frequently may result in an inefficient use of the computing resources of the local host system 110a. However, if the function autoscaling component 164 does not poll the event queue 202 frequently enough, then the function autoscaling component 164 may not have sufficient information to appropriately modify the event headers. Accordingly, the frequency at which the function autoscaling component 164 may be adjusted in view of the number of events in the event queue 202. When the number of events in the event queue 202 is below a threshold, indicating that the number of the events in the event queue 202 is relatively low, then the function autoscaling component 164 may poll the event queue 202 at a lower frequency (e.g., less often). When the number of the events in the event queue is above a threshold, then the function autoscaling component 164 may poll the event queue 202 at a higher frequency (e.g., more often). In embodiments, multiple thresholds associated with multiple polling frequencies may be used.

The function autoscaling component 164 may use the information received from polling the event queue 202 to determine a projected computing resource usage for execution of the actions associated with the events included in the event queue 202. The projected computing resource usage may correspond to an estimated amount of computing resources that will be utilized by the execution of each event in the event queue. For example, the projected computing resource usage may correspond to an estimate of the amount of computing bandwidth, memory, and storage space that will be used for an event that is to store an object at a bucket at a host system. In some embodiments, the function autoscaling component 164 may scale the number of serverless functions supported by local host system 110a for the execution of the actions associated with the events in the event queue 202.

The function autoscaling component 164 may compare the projected computing resource usage for the events in the event queue to the computing resources of local host system 110a that are available for the execution of the actions associated with the events in the event queue 202. The function autoscaling component 164 may determine how many of the actions may be executed by the local host system 110a in view of the comparison. For example, the function autoscaling component 164 may determine that the local host system 110a has sufficient computing resources to execute 20 events in the event queue 202. Upon determining which actions may be executed by the local host system 110a and which actions are to be executed by remote host system 110b, the function autoscaling component 164 may modify the headers of the events associated with the actions to indicate whether each event is to be directed to an endpoint for one of serverless functions 204a-n at the local host system 110a, or an endpoint one of serverless functions 206a-n at remote host system 110b.

In some embodiments, the function autoscaling component 164 may determine which events in the event queue 202 are to be performed by the local host system 110a and which events in the event queue 202 are to be performed by the remote host system 110b in view of one or more priorities associated with the events in the event queue 202. In embodiments, different priorities may be assigned to different events in the event queue 202. For example, events of a particular type or from a particular entity/user may be assigned a higher priority than other types of events. Events in the event queue 202 with a higher priority may be given a higher priority to be executed at the local host system 110a than events in the event queue 202 with a lower priority.

Upon modifying the headers, the events in the event queue 202 are pushed to the event broker component 162 for direction to the various serverless functions. The event broker component 162 may examine the header that has been modified by the function autoscaling component 164 for each of the events in the event queue 202. The event broker component 162 may direct the different events to serverless functions 204a-n at the local host system 110a or a serverless functions 206a-n of remote host system 110b in view of the header. For example, if the function autoscaling component 164 modified a header of a first event to indicate that the event is to be executed by the local host system 110a, then the event broker component 162 may direct the first event to one of serverless functions 206a-n supported by the local host system 110a. In another example, if the function autoscaling component 164 modified a header of a second event to indicate that the event is to be executed by remote host system 110b, then the event broker component 162 may direct the second event to one of serverless functions 206a-n supported by remote host system 110b.

Figure 3:
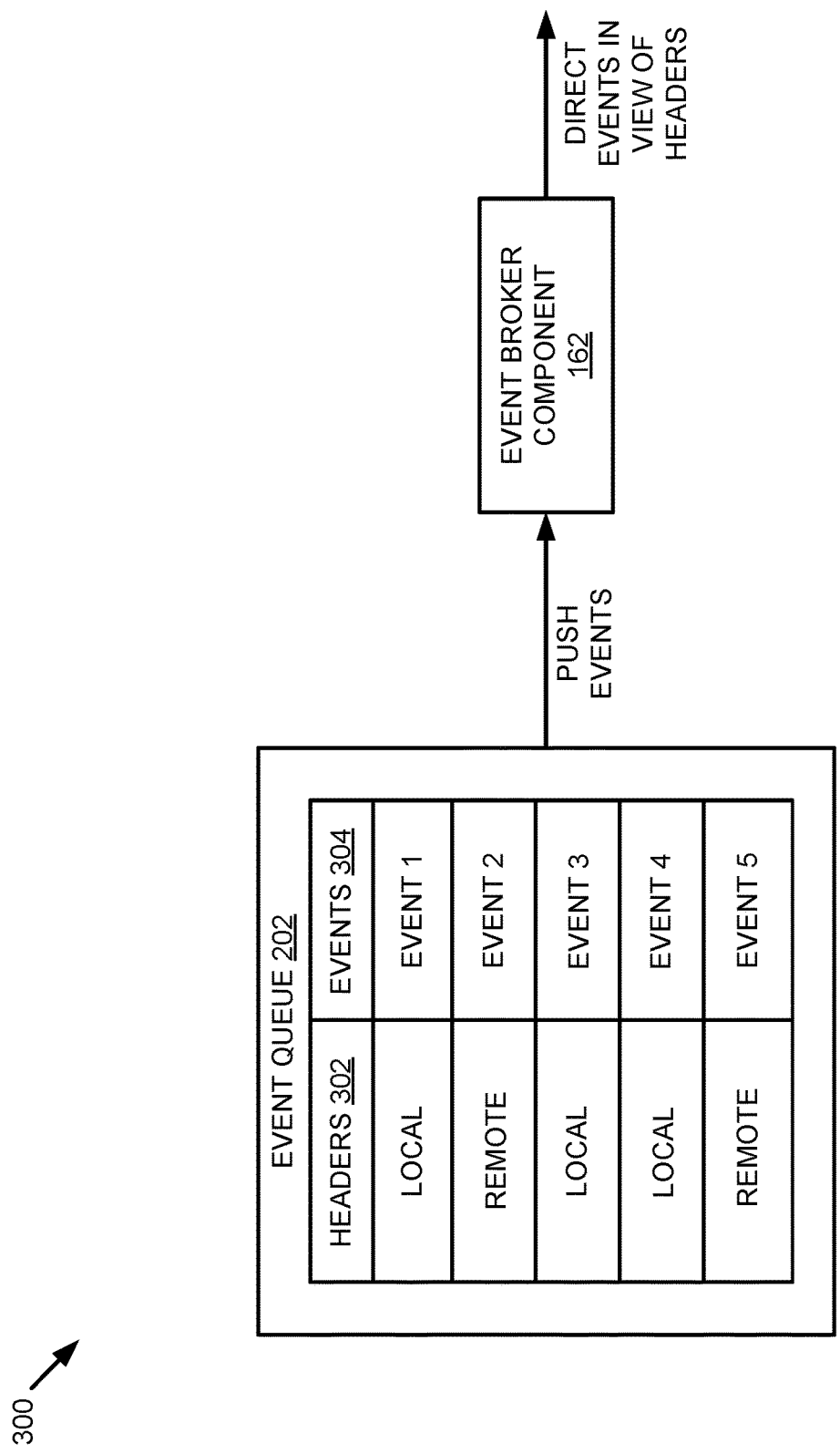
FIG. 3 is an illustration of an example of an event queue that is pushed to an event broker component, in accordance with embodiments of the disclosure.

FIG. 3 is an illustration 300 of an example of an event queue that is pushed to an event broker component, in accordance with embodiments of the disclosure. Illustration 300 includes an event queue 202 and event broker component 162, as previously described at FIGS. 1 and 2. The event queue 202 may include a listing of events 304 and corresponding headers 302 for each of the events in the event queue 202. As previously described, the function autoscaling component (not shown) may modify the header 302 to indicate which host system of a serverless function architecture is to execute the actions associated with a particular event.

Referring to FIG. 3, the corresponding headers 302 for events 1, 3, and 4 indicate that these events are to be directed to serverless functions of the local host system, while the corresponding headers 302 for events 2 and 5 are to be directed to serverless functions of the remote host system. Therefore, when the event queue 202 is pushed to the event broker component 162, the event broker component 162 may direct events 1, 3, and 4 to serverless functions of the local host system and events 2 and 5 to serverless functions of the remote host system, as previously described.

FIG. 4 is a flow diagram of a method 400 of utilizing a push and poll event broker, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by event broker component 162 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a plurality of events to be executed by one or more serverless functions from an event queue.

At block 420, the processing logic determines that a first set of the plurality of events are to be executed by one or more serverless functions at a local host system and a second set of the plurality of serverless functions are to be executed at one or more serverless functions at a remote host system.

At block 430, the processing logic directs the first set of the plurality of events to the one or more serverless functions at the local host system and the second set of the plurality of events to the one or more serverless functions at the remote host system.

Figure 5:
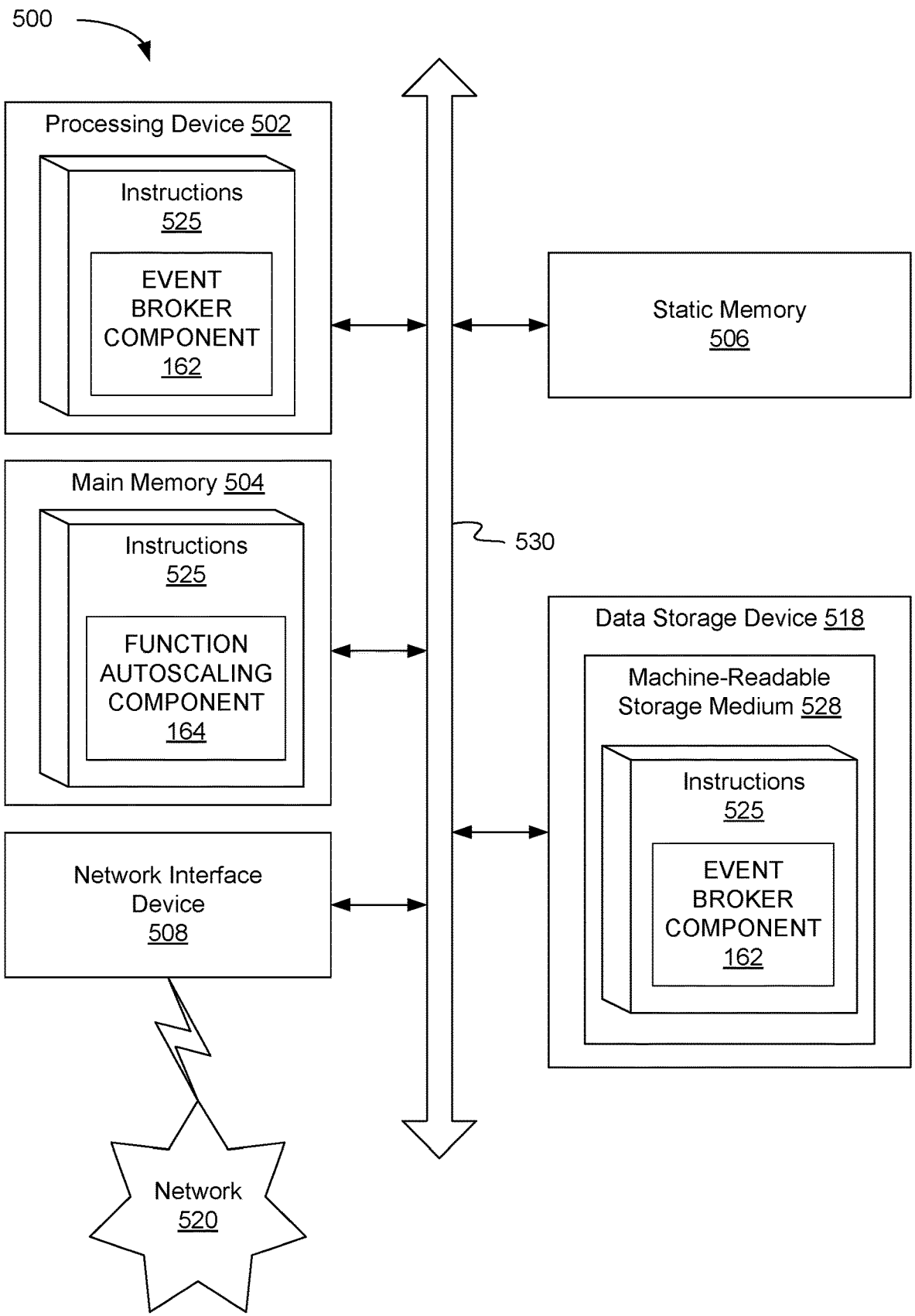
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for an event broker component, e.g., event broker component 162 and/or a function autoscaling component, e.g., function autoscaling component 164 for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware-for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, from an event queue of a local host system, a plurality of events to be executed by one or more serverless functions;

determining a polling frequency to be used for polling the event queue based on a number of the plurality of events, wherein the polling uses processing resources of the local host system;

in response to determining that processing resources at the local host system are not sufficient to process the plurality of events at the local host system due in part to a change in the polling frequency and the processing resources consumed by the polling, determining, by a processing device of the local host system, that a first set of the plurality of events are to be executed locally by one or more serverless functions at the local host system and a second set of the plurality of events are to be executed remotely at one or more serverless functions at a remote host system;

assigning priorities to the plurality of events and dividing the plurality of events between the first set to be executed locally and the second set to be executed remotely based on the priorities by assigning higher priority events to the first set to be executed locally; and directing the first set of the plurality of events to the one or more serverless functions at the local host system and the second set of the plurality of events to the one or more serverless functions at the remote host system.

2. The method of claim 1, further comprising:
determining an amount of computing resources of the local host system that are available to support the one or more serverless functions at the local host system; and
polling the event queue to identify the first set of the plurality of events to be executed by the one or more serverless functions at the local host system in view of the amount of computing resources that are available to support the one or more serverless functions at the local host system.

3. The method of claim 2, further comprising:
generating a corresponding predicted computing resource usages for each of the plurality of events, wherein the first set of the plurality of events and the second set of the plurality of events are identified in view of the corresponding predicted computing resource usages.

4. The method of claim 2, further comprising:
modifying a corresponding header of each of the plurality of events to indicate whether each of the plurality of events is included in the first set of the plurality of events or the second set of the plurality of events.

5. The method of claim 1, wherein the local host system has a lower latency for executing the plurality of events than the remote host system.

6. A system comprising:
a memory; and
a processing device of a local host system, operatively coupled to the memory, to:
receive, from an event queue of the local host system, a plurality of events to be executed by one or more serverless functions;
determine a polling frequency to be used for polling the event queue based on a number of the plurality of events, wherein the polling uses processing resources of the local host system;
in response to a determination that processing resources at the local host system are not sufficient to process the plurality of events at the local host system due in part to a change in the polling frequency and the processing resources consumed by the polling, determine that a first set of the plurality of events are to be executed locally by one or more serverless functions at the local host system and a second set of the plurality of events are to be executed remotely at one or more serverless functions at a remote host system;
assign priorities to the plurality of events and divide the plurality of events between the first set to be executed locally and the second set to be executed remotely based on the priorities, wherein higher priority events are assigned to the first set to be executed locally; and
direct the first set of the plurality of events to the one or more serverless functions at the local host system and the second set of the plurality of events to the one or more serverless functions at the remote host system.

7. The system of claim 6, wherein the processing device is further to:
determine an amount of computing resources of the local host system that are available to support the one or more serverless functions at the local host system; and
poll the event queue to identify the first set of the plurality of events to be executed by the one or more serverless functions at the local host system in view of the amount of computing resources that are available to support the one or more serverless functions at the local host system.

8. The system of claim 7, wherein the processing device is further to:
generate a corresponding predicted computing resource usages for each of the plurality of events, wherein the first set of the plurality of events and the second set of the plurality of events are identified in view of the corresponding predicted computing resource usages.

9. The system of claim 7, wherein the processing device is further to:
modify a corresponding header of each of the plurality of events to indicate whether each of the plurality of events is included in the first set of the plurality of events or the second set of the plurality of events.

10. The system of claim 6, wherein the local host system has a lower latency for executing the plurality of events than the remote host system.

11. A non-transitory computer-readable storage medium including instructions that, when executed by a processing device of a local host system, cause the processing device to:
receive, from an event queue of the local host system, a plurality of events to be executed by one or more serverless functions;
determine a polling frequency to be used for polling the event queue based on a number of the plurality of events, wherein the polling uses processing resources of the local host system;
in response to a determination that processing resources at the local host system are not sufficient to process the plurality of events at the local host system due in part to a change in the polling frequency and the processing resources consumed by the polling, determine, by the processing device of the local host system, that a first set of the plurality of events are to be executed locally by one or more serverless functions at the local host system and a second set of the plurality of events are to be executed remotely at one or more serverless functions at a remote host system;
assign priorities to the plurality of events and divide the plurality of events between the first set to be executed locally and the second set to be executed remotely based on the priorities, wherein higher priority events are assigned to the first set to be executed locally; and direct the first set of the plurality of events to the one or more serverless functions at the local host system and the second set of the plurality of events to the one or more serverless functions at the remote host system.

12. The non-transitory computer-readable storage medium of claim 11, wherein the processing device is further to:
determine an amount of computing resources of the local host system that are available to support the one or more serverless functions at the local host system; and
poll the event queue to identify the first set of the plurality of events to be executed by the one or more serverless functions at the local host system in view of the amount of computing resources that are available to support the one or more serverless functions at the local host system.

13. The non-transitory computer-readable storage medium of claim 12, wherein the processing device is further to:
generate a corresponding predicted computing resource usages for each of the plurality of events, wherein the first set of the plurality of events and the second set of the plurality of events are identified in view of the corresponding predicted computing resource usages.

14. The non-transitory computer-readable storage medium of claim 12, wherein the processing device is further to:
modify a corresponding header of each of the plurality of events to indicate whether each of the plurality of events is included in the first set of the plurality of events or the second set of the plurality of events.

\* \* \* \* \*

UNITED STATES PATENT AND TRADEMARK OFFICE
CERTIFICATE OF CORRECTION

| | | |
|---|---|---|
| PATENT NO. | : 11,977,907 B2 | Page 1 of 1 |
| APPLICATION NO. | : 17/202509 | |
| DATED | : May 7, 2024 | |
| INVENTOR(S) | : Roland Ludwig Huss et al. | |

It is certified that error appears in the above-identified patent and that said Letters Patent is hereby corrected as shown below:

On the Title Page

Item (54), please replace "HYBRID PUSH AND PULL" with -- HYBRID PUSH AND POLL --.

In the Specification

In Column 1, Line 1-3, please replace "HYBRID PUSH AND PULL" with -- HYBRID PUSH AND POLL --.

In Column 2, Line 17, please replace "building, than a cluster" with -- building, then a cluster --.

In the Claims

In Column 11, Line 1, please replace "pollinq frequency" with -- polling frequency --.

In Column 11, Line 1, please replace "pollinq the event queue" with -- polling the event queue --.

In Column 11, Line 8, please replace "the pollinq frequency" with -- the polling frequency --.

In Column 11, Line 57, please replace "determine a pollinq frequency to be used for pollinq" with -- determine a polling frequency to be used for polling --.

Signed and Sealed this
Third Day of June, 2025

Coke Morgan Stewart
*Acting Director of the United States Patent and Trademark Office*